United States Patent
Choi

(10) Patent No.: US 8,279,630 B2
(45) Date of Patent: Oct. 2, 2012

(54) CONTINUOUS CONDUCTION MODE POWER FACTOR CORRECTION CIRCUIT WITH REDUCED SENSING REQUIREMENTS

(75) Inventor: Hangseok Choi, Bedford, NH (US)

(73) Assignee: Fairchild Semiconductor Corporation, South Portland, ME (US)

( * ) Notice: Subject to any disclaimer, the term of this patent is extended or adjusted under 35 U.S.C. 154(b) by 876 days.

(21) Appl. No.: 12/250,771

(22) Filed: Oct. 14, 2008

(65) Prior Publication Data

US 2011/0038188 A1      Feb. 17, 2011

(51) Int. Cl.
    *H02M 3/335* (2006.01)
(52) U.S. Cl. .......................... 363/18; 363/21.12; 323/222
(58) Field of Classification Search ............... 363/21.12, 363/21.13, 21.18, 80, 82, 89, 90, 97; 323/222, 323/223, 232, 271
See application file for complete search history.

(56) References Cited

U.S. PATENT DOCUMENTS

| | | | | |
|---|---|---|---|---|
| 5,717,578 | A * | 2/1998 | Afzal | 320/111 |
| 5,949,229 | A | 9/1999 | Choi et al. | |
| 6,178,104 | B1 * | 1/2001 | Choi | 363/89 |
| 6,657,417 | B1 | 12/2003 | Hwang | |
| 6,980,445 | B2 * | 12/2005 | Fukumoto et al. | 363/45 |
| 7,417,879 | B2 * | 8/2008 | Sawtell | 363/89 |
| 7,538,525 | B2 * | 5/2009 | Kim et al. | 323/205 |
| 2006/0192537 | A1 | 8/2006 | Hagen et al. | |

OTHER PUBLICATIONS

Application Note 42047—Power Factor Correction (PFC) Basics; Aug. 19, 2004, pp. 1-10, Fairchild Semiconductor Corporation.
R. Brown, et al., "PFC Converter Design with IR1150 Once Cycle Control IC", Mar. 2005, pp. 1-18, International Rectifier, Application Note AN-1077.
μPFC One Cycle Control PFC IC, Feb. 5, 2007, pp. 1-16, International Rectifier Data Sheet No. PD60230 revC, IR1150(S)(PbF) IR1150I(S)(PbF).
NCP1653, NCP1653A—Compact, Fixed-Frequency, Continuous Conduction Mode PFC Controller, Mar. 2007, pp. 1-19, Semiconductor Components Industries, LLC.
CCM-PFC—ICE1PCS02 ICE1PCS02G, Power Management & Supply Preliminary Datasheet, Version 1.0, Sep. 7, 2004, pp. 1-17, Infineon Technologies AG1999.
GPTAC Series—SPD, GPTAC1300, Continuous Current Mode Power Factor Correction PF Switch, Data Sheet Application Notes, 2004, pp. 1-19, Green Power Technologies Ltd.
GPTC110XX, Continuous Current Mode Power Factor Correction Controllers Family, Data Sheet Application Note, 2004-2005, pp. 1-24, Green Power Technologies Ltd.

* cited by examiner

*Primary Examiner* — Nguyen Tran
(74) *Attorney, Agent, or Firm* — Okamoto & Benedicto LLP

(57) ABSTRACT

A power supply circuit includes continuous conduction mode power factor correction (PFC). The PFC may be performed by generating a carrier signal voltage at a beginning of a switching cycle of the power supply, generating a sampling voltage indicative of drain current of a drive transistor, and detecting when the carrier signal voltage has decreased to the same level as the sampling voltage at an intersection time. The ON time of the drive transistor may be set to twice the intersection time.

19 Claims, 7 Drawing Sheets

CONTINUOUS CONDUCTION MODE POWER FACTOR CORRECTION CIRCUIT WITH REDUCED SENSING REQUIREMENTS

BACKGROUND OF THE INVENTION

1. Field of the Invention

The present invention relates generally to electrical circuits, and more particularly but not exclusively to power factor correction.

2. Description of the Background Art

Power factor correction (PFC) is employed in power supply circuits to make the power supply appear as a purely resistive load as possible to the input AC (alternating current) line. In a nutshell, power factor correction allows current and voltage waveforms to be in-phase.

FIG. 1 shows an example switch mode power supply (SMPS) circuit 100 with continuous conduction mode (CCM) power factor correction (PFC). The power supply circuit 100 receives an input AC line voltage Vi and generates a power factor corrected output voltage Vo. The power supply circuit 100 is configured as a boost converter.

The power supply circuit 100 includes a voltage error amplifier circuit 103 that compares the output voltage $V_O$ against a reference voltage $V_{ref}$ to develop an error voltage indicative of the value of the output voltage $V_O$. A multiplier 102 multiplies a sinusoidal reference 101 with the error voltage. For power factor correction, the sinusoidal reference 101 provides the requisite signal that is proportional to the rectified input AC line. A current error amplifier 104 compares the output of the multiplier 102 against the inductor current $I_L$ of the energy transfer inductor L to force the average current waveform to follow the voltage waveform. A PWM (pulse width modulation) modulator 105 compares the output of the current error amplifier 104 against a reference ramp signal to control switching of the drive transistor M to develop the output voltage $V_O$ in a way that the input line current $I_i$ is in phase with the line voltage Vi, thereby maintaining a desired power factor of 1.0.

FIG. 2 shows the average of the inductor current $I_{L,AVG}$ in relation to the inductor current $I_L$. FIG. 2 generally illustrates continuous conduction mode PFC. Note that unlike in discontinuous conduction mode PFC, the drive transistor M is controlled such that the inductor current $I_L$ does not reach zero during the switching cycle.

Also shown in FIG. 1 are a full-wave rectifier 106, an input capacitor Ci, an output diode D1, an output capacitor Co, and an output resistor Ro. As can be appreciated, the Power supply circuit 100 requires a multiplier, line sensing, and inductor current sensing for power factor correction.

SUMMARY

A power supply circuit includes continuous conduction mode power factor correction (PFC). The PFC may be performed by generating a carrier signal voltage at a beginning of a switching cycle of the power supply, generating a sampling voltage indicative of drain current of a drive transistor, and detecting when the carrier signal voltage has decreased to the same level as the sampling voltage at an intersection time. The ON time of the drive transistor may be set to twice the intersection time.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
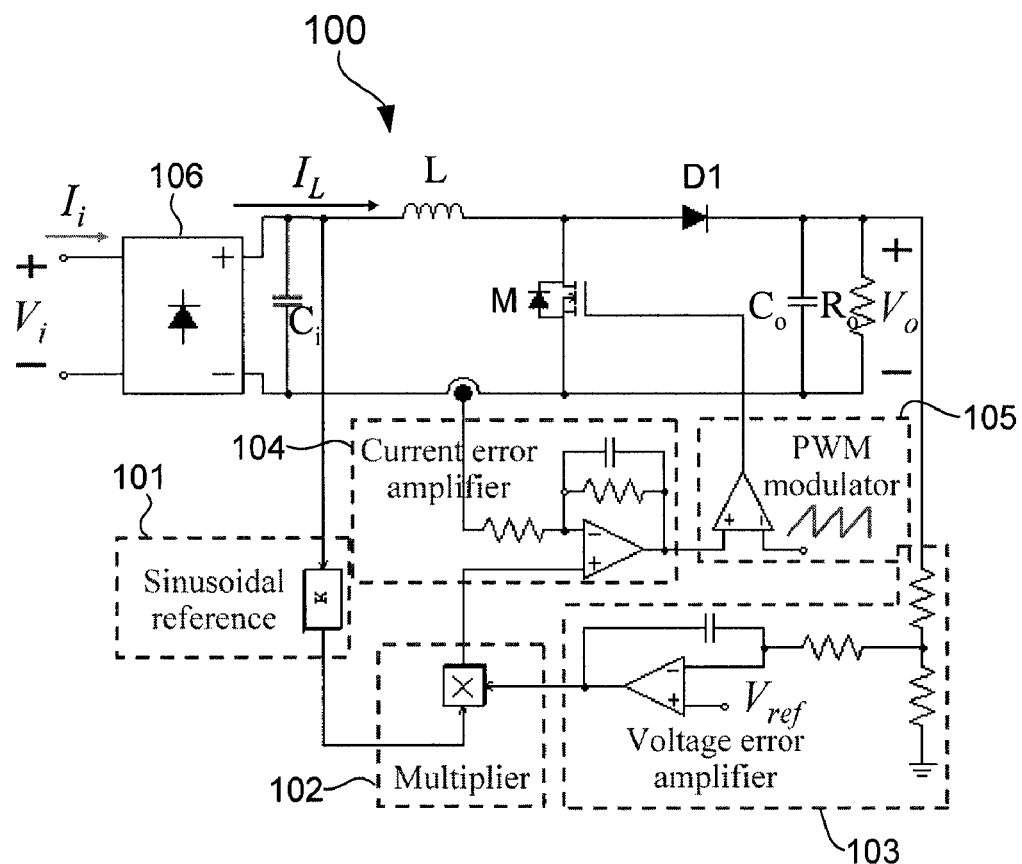
FIG. 1 shows an example switch mode power supply circuit with continuous conduction mode power factor correction.
Figure 2:
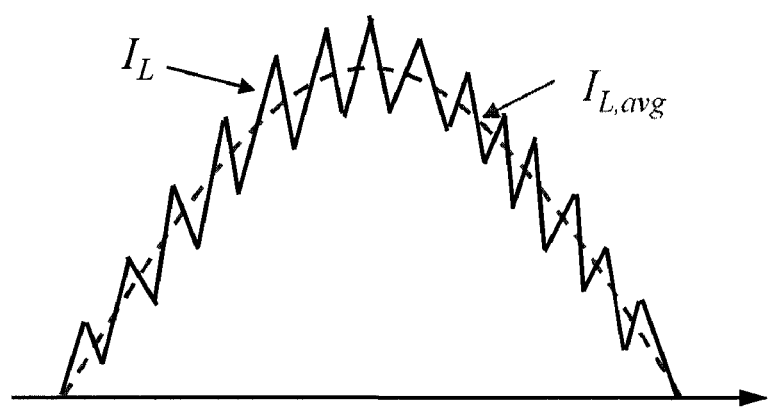
FIG. 2 shows the average of the inductor current in relation to the inductor current in the power supply of FIG. 1.
Figure 3:
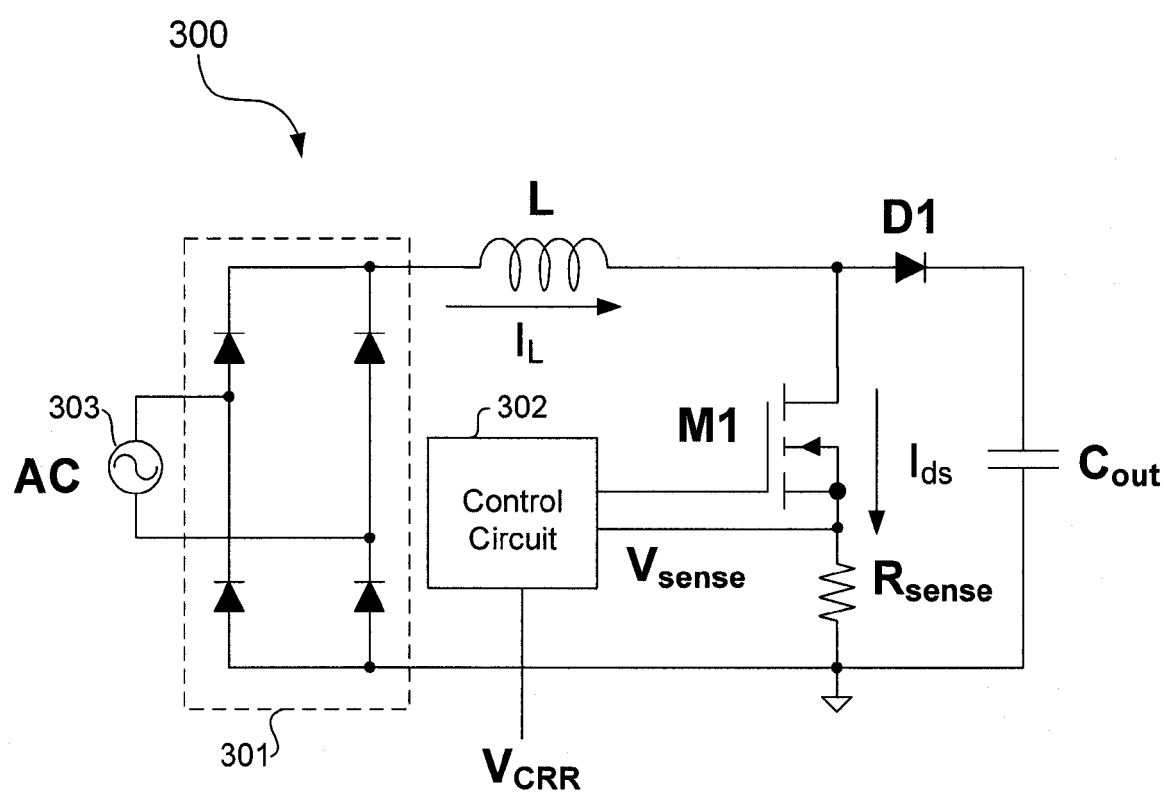
FIG. 3 schematically shows a switch mode power supply circuit with continuous conduction mode power factor correction in accordance with an embodiment of the present invention.

FIG. 3 schematically shows a switch mode power supply circuit 300 with continuous conduction mode (CCM) power factor correction in accordance with an embodiment of the present invention. CCM is a mode of PFC operation wherein the inductor current $I_L$ through the energy transfer inductor L never reaches zero during the switching cycle (e.g., see FIG. 2). In contrast, discontinuous conduction mode of PFC operation is characterized by the drive transistor being turned ON when the inductor current $I_L$ becomes zero. The power supply circuit 300 is configured as a boost converter in that the output voltage $V_O$ developed across the output capacitor $C_{out}$ is greater than the peak of the voltage of the AC line signal 303.

As will be more apparent below, unlike conventional power supplies with continuous conduction mode PFC, the power supply circuit 300 advantageously does not necessarily require line sensing, a multiplier, and inductor current sensing for power factor correction.

In the example of FIG. 3, the voltage of the AC signal 303 is rectified by a full-wave rectifier 301. The fully rectified AC line voltage is provided to the energy transfer inductor L, which is coupled to the output capacitor $C_{out}$ by way of an output diode D1.

A control circuit 302 controls the switching of the drive transistor M1 not only to maintain the output voltage $V_O$ across the output capacitor $C_{out}$ but also to shape the average of the inductor current so that it has the same shape as the rectified AC line voltage. When the drive transistor M1 is switched ON, the inductor current $I_L$ is charged up while flowing through the transistor M1. When the drive transistor M1 is switched OFF, the inductor current $I_L$ through the inductor L is discharged to the capacitor $C_{out}$ through the output diode D1. The current flowing through the drain and source of the drive transistor M1 is labeled in FIG. 3 as the current $I_{ds}$. In one embodiment, the drive transistor M1 comprises a metal oxide semiconductor field effect transistor (MOSFET) and the current $I_{ds}$ flows through the drain terminal of the MOSFET.

In one embodiment, the control circuit 302 receives a carrier signal voltage $V_{CRR}$ and a sampling voltage $V_{sense}$ as inputs and generates a control signal for controlling switching of the drive transistor M1. The carrier signal voltage $V_{CRR}$ may be developed within the control circuit 302 using a carrier generator (e.g., see FIG. 8, carrier generator 804). In the example of FIG. 3, the sampling voltage $V_{sense}$ is the voltage developed across the resistor $R_{sense}$ by the current $I_{ds}$, which flows through the drain and source of the drive transistor M1 when it is switched ON. As can be appreciated, the sampling voltage $V_{sense}$ is indicative of the current $I_{ds}$ of the drive transistor M1. In one embodiment, the control circuit 302 is configured to measure an intersection time $T_X$ when the carrier signal voltage $V_{CRR}$ is equal (i.e., same magnitude and polarity) to the sampling voltage $V_{sense}$, and to turn ON the drive transistor M1 for a time twice the intersection time $T_X$ in a full switching cycle. This aspect of the invention is further described with reference to FIG. 4.

Figure 4:
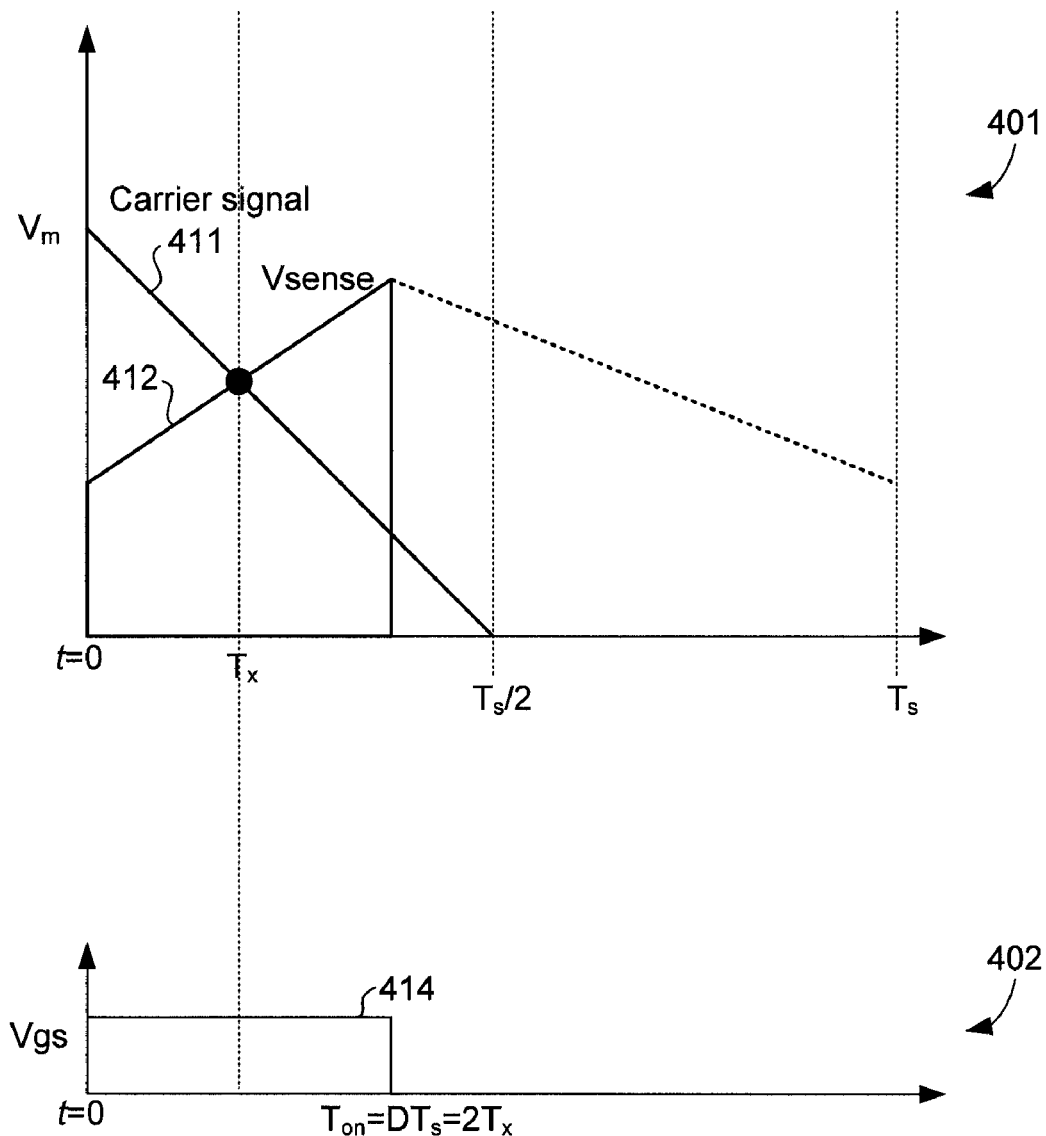
FIG. 4 shows plots of waveforms of signals in the power supply circuit of FIG. 3 in accordance with an embodiment of the present invention.

FIG. 4 shows plots 401 and 402 of waveforms of signals in the power supply circuit 300 in accordance with an embodiment of the present invention. Plots 401 show waveforms of the carrier signal voltage $V_{CRR}$ (see 411) and of the sampling voltage $V_{sense}$ (see 412). A switch mode power supply, such as the power supply circuit 300, operates at a particular switching frequency. The time $T_s$ is equal to the period of the power supply's switching frequency, and is thus the duration of one switching cycle. The voltage $V_m$ is the maximum voltage of the carrier signal voltage $V_{CRR}$. As shown in FIG. 4, the carrier signal voltage $V_{CRR}$ decreases linearly from a maximum voltage $V_m$ at the very beginning of the switching cycle at time zero, down to zero volt at the end of the first half of the switching cycle at time $T_s/2$. The carrier signal voltage $V_{CRR}$ remains at zero volt for the rest of the switching cycle.

The sampling voltage $V_{sense}$ increases as the current $I_{ds}$ flows through the drive transistor M1 in the first half of the switching cycle. At the intersection time $T_X$, the carrier signal voltage $V_{CRR}$ crosses with the sampling voltage $V_{sense}$. The control circuit 302 monitors the sampling voltage $V_{sense}$ and the carrier signal voltage $V_{CRR}$ to measure the intersection time Tx, and controls the drive transistor M1 such that it is ON for a time equal to twice the time Tx. This is shown in plot 402 where the control circuit 302 applies the control signal to the gate of the drive transistor M1 such that the gate-source voltage Vgs (see 414) of the drive transistor M1 is a logical HIGH during the time period from time zero at the very beginning of the switching cycle to time 2Tx (i.e., twice the intersection time Tx). At the end of the time 2Tx, the control circuit 302 switches OFF the drive transistor M1 for the rest of the switching cycle. That is, the control circuit 302 is configured such that the ON time $T_{ON}$ of the drive transistor M1 per switching cycle is equal to a time 2Tx, which is equal to the duty cycle D of the power supply circuit 300 multiplied by the switching cycle time Ts. This is explained in equation form as $$T_{ON} = DT_S = 2T_X \qquad \text{EQ. 1}$$

where $T_{ON}$ is the ON time of the drive transistor M1, D is the duty cycle of the power supply circuit 300, and $T_X$ is the intersection time for the carrier signal voltage $V_{CRR}$ to linearly decrease to the same voltage as the sampling voltage $V_{sense}$. Note that the ON time of the drive transistor M1 starts at the very beginning of the switching cycle in this example.

Figure 5:
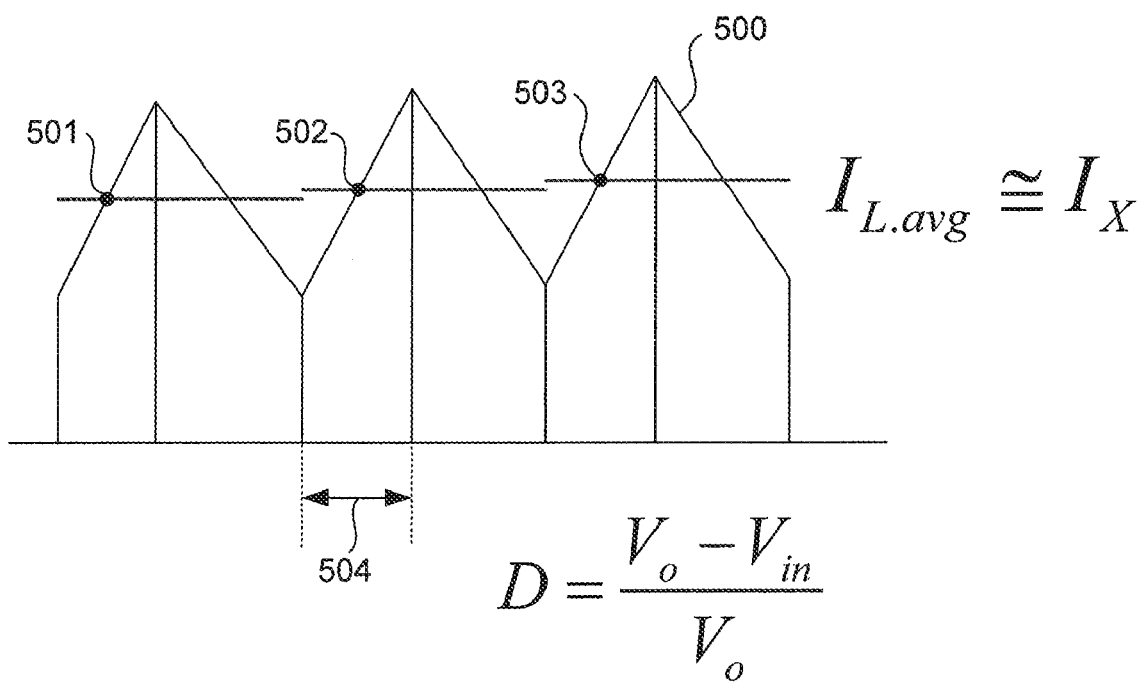
FIG. 5 shows the relationship between drain current of a drive transistor and average inductor current.

In continuous conduction mode of PFC operation, the drain current of the drive transistor M1 at the middle of its conduction time is approximately the same as the average of the inductor current $I_{L,AVG}$. That is, $$I_X \cong I_{L,avg} \qquad \text{EQ. 2}$$

where $I_X$ is the drain current of the drive transistor M1 at the intersection time $T_X$ and $I_{L,AVG}$ is the average of the inductor current at the intersection time $T_X$. This relationship between drain current and average inductor current is shown in FIG. 5. FIG. 5 shows points 501, 502, and 503 on the waveform of the drain current of the drive transistor M1 where the drain current is approximately the same as the average of the inductor current. The vertical lines in FIG. 5 are there to indicate time interval; the inductor current does not go to zero in continuous conduction mode.

The carrier signal may be described as, $$V_{CRR}(t) = V_m\left(1 - 2\frac{t}{T_s}\right) \qquad \text{EQ. 3}$$

where $V_{CCR}(t)$ is the carrier signal voltage as a function of time t, $V_m$ is the maximum voltage of the carrier signal at time t=0 at the beginning of the switching cycle, and $T_S$ is the time period of the switching cycle. The duty cycle D of a continuous conduction mode boost converter, such as the power supply circuit 300, is $$D = \frac{V_o - V_{in}}{V_o} = 1 - \frac{V_{in}}{V_o} \Rightarrow 1 - D = \frac{V_{in}}{V_o} \qquad \text{EQ. 4}$$

where D is the duty cycle of the power supply circuit 300, $V_O$ is the output voltage, and $V_{in}$ is the input sinusoidal AC line voltage. Combining EQ. 3 and EQ. 4 gives $$I_X R_{sense} = V_X = V_m\left(\frac{V_{in}}{V_o}\right) \qquad \text{EQ. 5}$$

where $I_X$ is the drain current of the drive transistor M1 at the intersection time $T_X$ and $V_X$ is the voltage across the resistor $R_{sense}$ at the intersection time $T_X$. From EQ. 5, the voltage $V_X$ and the current $I_X$ are proportional to the voltage $V_{in}$ of the sinusoidal input AC line signal 303. Therefore, the power supply circuit 300 is able to perform continuous conduction mode PFC without necessarily requiring line sensing to obtain a sinusoidal reference. The foregoing analysis also shows that the control circuit 300 is able to determine the suitable ON time of the drive transistor M1 by finding the intersection time $T_X$ from the carrier signal $V_{CRR}$ and the sampling voltage $V_{sense}$ across the resistor $R_{sense}$.

Figure 6:
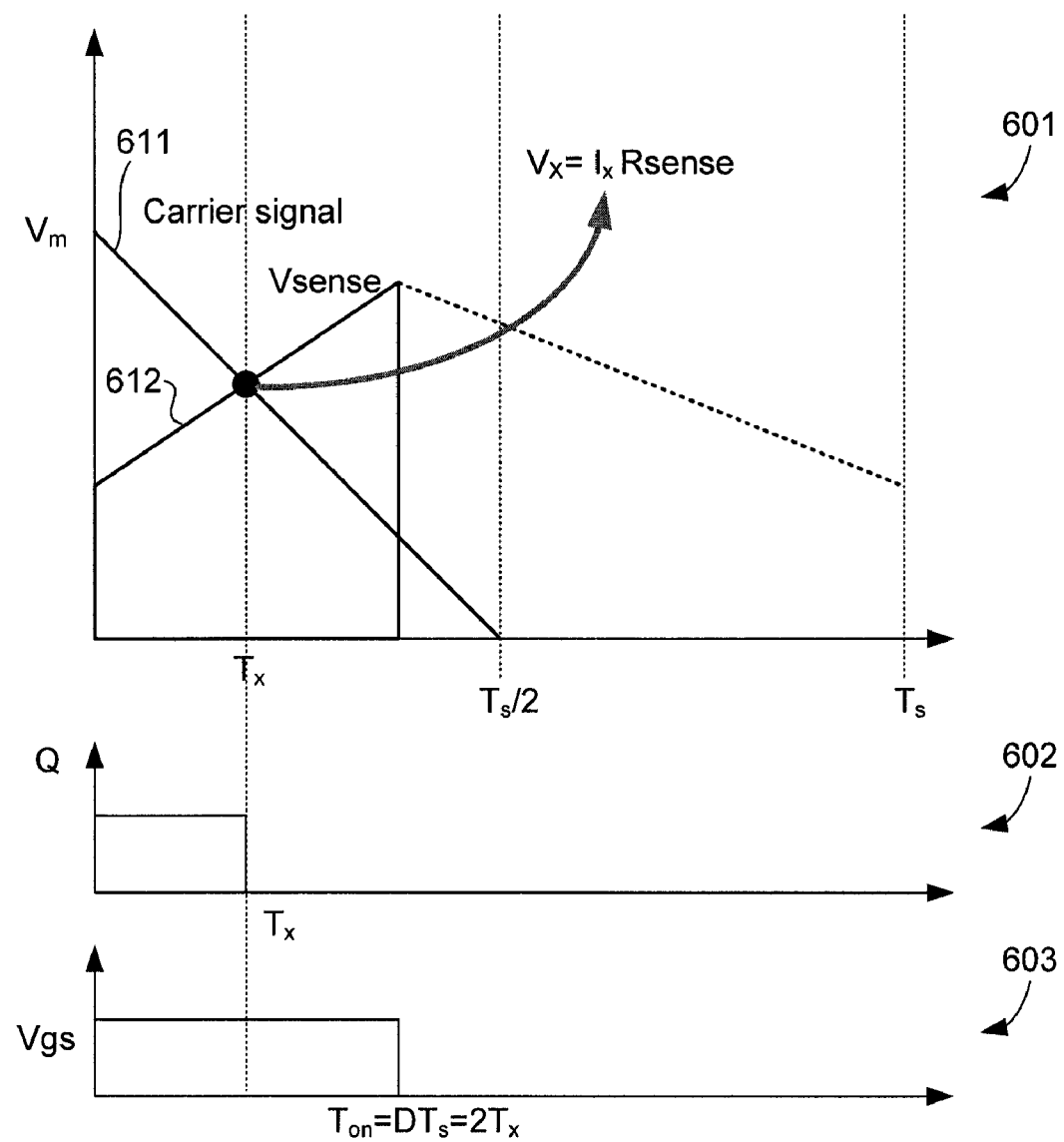
FIG. 6 shows plots of waveforms of signals in a power supply circuit in accordance with an embodiment of the present invention.

FIG. 6 show plots 601, 602, and 603 illustrating the foregoing analysis. Plot 601 shows the carrier signal $V_{CCR}$ (see 611) decreasing from a voltage $V_m$ starting at t=0 to zero volt at t=$T_S/2$ in a switching cycle time $T_S$. The sampling voltage $V_{sense}$ is equal to the carrier signal $V_{CRR}$ at the intersection time $T_X$, which is a point in time characterized by EQ. 5. Plot 602 shows a waveform of a logic output Q that may be generated by the control circuit 302 to indicate when the intersection time $T_X$ occurs in any given switching cycle. Plot 603 shows a waveform of the gate-source voltage $V_{gs}$ of the drive transistor M1. In this example, the gate-source voltage $V_{gs}$ constitutes the control signal applied by the control circuit 302 to the drive transistor M1 to turn it ON. The falling edge of the logic output Q may be monitored to detect when the carrier signal $V_{CRR}$ has decreased to the same level as the sampling voltage $V_{sense}$, at which time the duration of the logic output Q may be doubled and used to set the turn ON time of the drive transistor M1.

Figure 7:
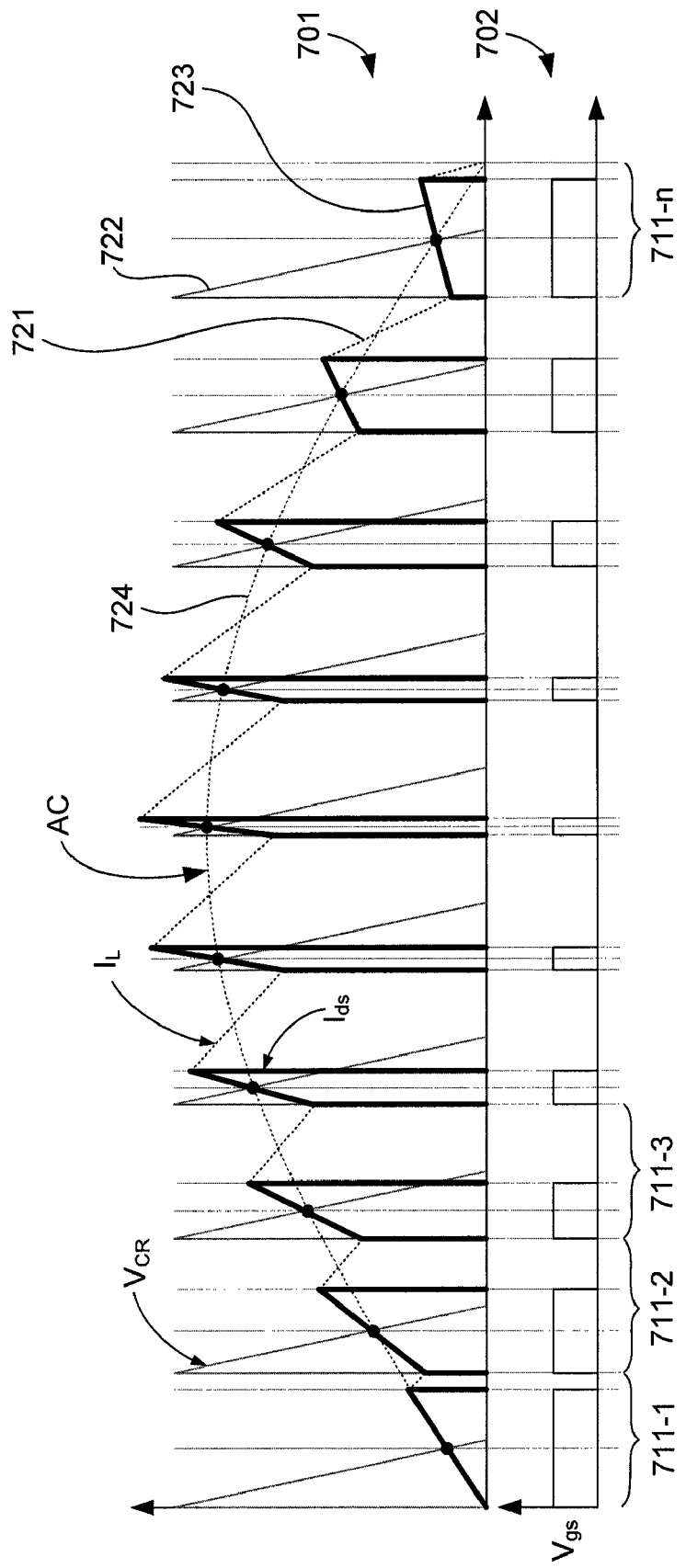
FIG. 7 shows plots that further illustrate the operation of the power supply circuit of FIG. 3 in accordance with an embodiment of the present invention.

FIG. 7 shows plots 701 and 702 further illustrating the operation of the power supply circuit 300 in accordance with an embodiment of the present invention. The example of FIG. 7 shows several switching cycles 711 (i.e., 711-1, 711-2, 711-3, . . . , 711-n). Plots 701 show waveforms of the inductor current $I_L$ (see 721), the carrier signal voltage $V_{CRR}$ (see 722), and the current $I_{ds}$ (see 723). Plot 702 shows the gate-source voltage $V_{gs}$ applied by the control circuit 302 to the drive transistor M1. The sinusoid AC line signal (see 724) is also shown in the plots 701 for reference. Note that for each switching cycle 711, the time the gate-source voltage $V_{gs}$, which constitutes the ON time of the drive transistor M1 in this example, is at a logical high is double the time for the carrier signal voltage $V_{CRR}$ to intersect the drain current $I_{ds}$ of the drive transistor M1. From FIG. 7, it can be seen that the average of the inductor current $I_L$ is sinusoidal in nature.

In light of the foregoing disclosure, those of ordinary skill in the art will appreciate that embodiments of the present invention provide advantages heretofore unrealized. Firstly, embodiments of the present invention allow for continuous conduction mode power factor correction without necessarily sensing the AC line signal and the inductor current. Secondly, embodiments of the present invention do not necessarily require multipliers. Thirdly, embodiments of the present invention allow for relatively fast and stable transient response of the current control loop, giving designers peace of mind by not having to deal with stability issues of the current loop. These result in a simpler and more robust power supply.

Figure 8:
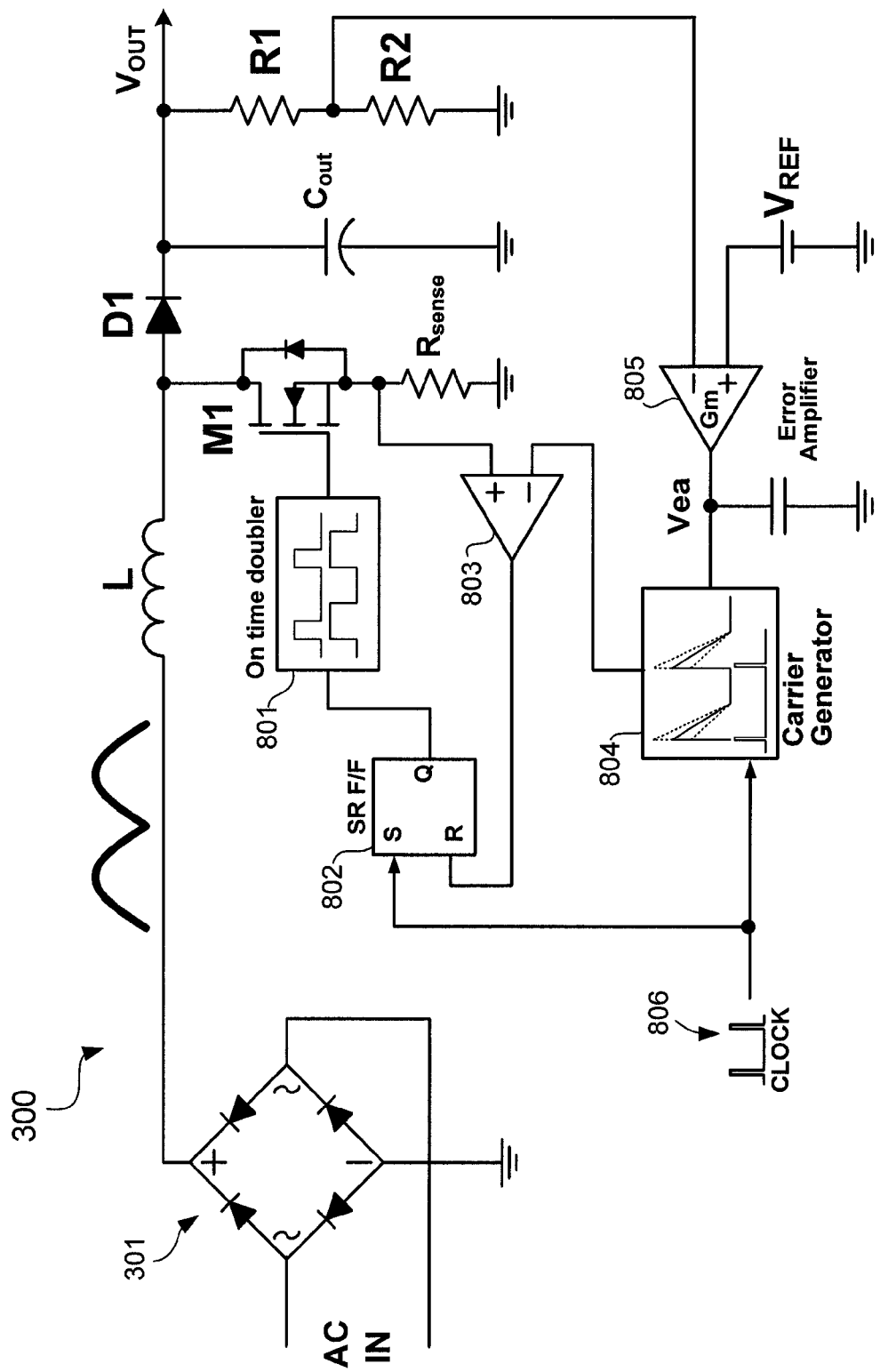
FIG. 8 schematically shows further details of the power supply circuit of FIG. 3 in accordance with an embodiment of the present invention.

Referring now to FIG. 8, there is schematically shown further details of the power supply circuit 300 in accordance with an embodiment of the present invention. The general operation of the power supply circuit 300 is as described with reference to FIG. 3. In the example of FIG. 8, the control circuit 302 is implemented using an ON time doubler 801, an SR flip-flop (F/F) 802, a voltage comparator 803, a carrier generator 804, and an error amplifier 805. As can be appreciated, the control circuit 302 may also be implemented in other ways without detracting from the merits of the present invention.

The input AC line voltage is rectified by the full-wave rectifier 301, which comprises a bridge rectifier in this example. The rectified AC line voltage is applied to the energy transfer inductor L, which is coupled to the output capacitor $C_{out}$ by way of the output diode D1. The output voltage $V_{OUT}$ is sampled using a voltage divider comprising resistors R1 and R2 and provided to an input of the error amplifier 805, where it is compared against a reference voltage $V_{REF}$. The output of the error amplifier 805 constitutes the difference between the output voltage $V_{OUT}$ and the reference voltage $V_{REF}$ and is provided to the carrier generator 804.

The carrier generator 804 comprises an electrical circuit for generating the carrier signal voltage $V_{CRR}$. In one embodiment, the carrier generator 804 generates the carrier signal voltage $V_{CRR}$ in accordance with EQ. 3. An input clock signal (see 806) has a frequency corresponding to the switching frequency of the power supply circuit 300. The carrier generator 804 receives the input clock signal to synchronize the generation of the carrier signal voltage $V_{CRR}$. The carrier generator 804 receives the output of the error amplifier 805, which is used to determine the peak of the carrier signal.

The voltage comparator 803 compares the carrier signal voltage $V_{CRR}$ generated by the carrier generator 804 against the sampling voltage $V_{sense}$ across the resistor $R_{sense}$. As explained, the sampling voltage $V_{sense}$ is indicative of the drain current of the drive transistor M1. The rising edge of the input clock signal sets the SR F/F 802 at the beginning of the switching cycle. The comparator 803 resets the SR F/F 802 when the sampling voltage $V_{sense}$ and the carrier signal voltage $V_{CRR}$ are at the same voltage level, which occurs at the intersection time $T_X$.

The ON time doubler 801 comprises an electrical circuit for generating the control voltage to control switching of the drive transistor M1. The ON time doubler 801 detects the beginning of the switching clock cycle with the rising edge of the logic output Q of the SR F/F 802. This occurs when the input clock sets the SR F/F 802. The ON time doubler 801 sends out the control signal to turn ON the drive transistor M1 at this time.

The ON time doubler 801 also detects the falling edge of the logic output Q, which occurs when the comparator 803 resets the SR F/F 802. The ON time doubler 801 is configured to measure the time the logic output Q is at a logical HIGH in that switching cycle, and generates the control signal to keep the drive transistor M1 turned ON for that additional time. In other words, the ON time doubler 801 turns ON the drive transistor M1 for a time equal to double the time the logical output Q is HIGH. As can be seen from the plot 602 of FIG. 6, the falling edge of the logical output Q may indicate when the intersection time $T_X$ occurs. The plot 603 of FIG. 6 shows the resulting control signal provided by the ON time doubler 801 to the drive transistor M1, which is a gate-source voltage $V_{GS}$ that is at a logical HIGH for a time that is twice that of the logical output Q.

A power supply circuit with improved power factor correction and method for operating same have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of performing power factor correction in a power supply, the method comprising:
   generating a carrier signal voltage at a beginning of a switching cycle of the power supply, the power supply operating in a continuous conduction mode where an inductor current flowing through an energy transfer inductor of the power supply does not decrease to zero in the switching cycle;
   generating a sampling voltage indicative of a drain current of a drive transistor of the power supply;
   detecting when the carrier signal voltage has decreased from a first voltage level at the beginning of the switching cycle to a second voltage level that is same as that of the sampling voltage at an intersection time;
   turning ON the drive transistor in the switching cycle for an ON time that is twice the intersection time based on detecting that the carrier signal voltage has decreased from the first voltage level to the second voltage level; and
   turning OFF the drive transistor for the rest of the switching cycle.

2. The method of claim 1 wherein the drive transistor comprises a metal oxide semiconductor field effect transistor (MOSFET).

3. The method of claim 1 wherein the carrier signal voltage linearly decreases from the first voltage level at the beginning of the switching cycle to a third voltage level equal to zero volt at a time halfway to the end of the switching cycle.

4. The method of claim 1 wherein the power supply is a boost converter.

5. The method of claim 1 wherein generating the sampling voltage comprises:
measuring a voltage developed on a sense resistor coupled to a drain of the drive transistor.

6. A power supply with power factor correction, the power supply comprising:
an output capacitor;
a drive transistor configured to be switched to control charging of the output capacitor by an inductor current flowing through an energy transfer inductor;
a control circuit configured to control switching of the drive transistor, the control circuit being configured to turn ON the drive transistor for an ON time in a switching cycle of the power supply and to turn OFF the drive transistor for remainder of the switching cycle, the control circuit being configured to set the ON time of the drive transistor to be longer than a time it takes for a voltage of a carrier signal to be at a same level as a sampling voltage developed by a current flowing through a terminal of the drive transistor based on a comparison of the voltage of the carrier signal to the sampling voltage, the carrier signal being configured to decrease from a maximum value at a first point in time to another value at a second point in time in the switching cycle.

7. The power supply of claim 6 wherein the control circuit comprises:
a carrier generator configured to generate the carrier signal;
a comparator configured to compare the carrier signal against the sampling voltage developed by the current flowing through the terminal of the drive transistor; and
an ON time doubler configured to set the ON time of the drive transistor as double the time it takes for the voltage of the carrier signal to be at a same level as the sampling voltage as indicated by the comparator.

8. The power supply of claim 7 further comprising:
a logic circuit coupled to receive an output of the comparator and to generate a logic output indicating the time it takes for the voltage of the carrier signal to be at the same level as the sampling voltage.

9. The power supply of claim 8 wherein the logic circuit sets the logic output at a beginning of the switching cycle and resets the logic output when the comparator indicates that the voltage of the carrier signal is at the same level as the sampling voltage.

10. The power supply of claim 9 wherein the logic circuit comprises an SR flip-flop.

11. The power supply of claim 6 wherein the carrier signal is configured to decrease linearly from the maximum value at the first point in time to zero at the second point in time after the first point in time, the second point in time being halfway to an end of the switching cycle.

12. The power supply of claim 6 wherein the transistor comprises a MOSFET and the terminal of the drive transistor comprises a drain terminal of the MOSFET.

13. The power supply of claim 6 wherein the first point in time is at a beginning of the switching cycle and the second point in time is halfway through the switching cycle.

14. A method of performing continuous conduction mode power factor correction in a power supply, the method comprising:
generating a carrier signal in a switching cycle of the power supply;
comparing the carrier signal to a sampling signal indicative of a current through a terminal of a drive transistor of the power supply to determine a measured time, the measured time being measured from a beginning of the switching cycle and being a length of time it takes for the carrier signal to be at a same level as the sampling signal; and
setting an ON time of a drive transistor of the power supply to be longer than the measured time based on the comparison of the carrier signal to the sampling signal;
wherein comparing the carrier signal to the sampling signal comprises: determining when a voltage of the carrier signal has decreased linearly to a same level as a voltage of the sampling signal.

15. The method of claim 14 wherein the measured time is a length of time when a voltage of the carrier signal decreases to a same level as a voltage of the sampling signal.

16. The method of claim 14 wherein the ON time of the drive transistor is set to twice the measured time.

17. The method of claim 14 wherein the drive transistor comprises a MOSFET and the terminal of the transistor comprises a drain of the MOSFET.

18. The method of claim 14 wherein the voltage of the carrier signal is at a maximum value at a beginning of the switching cycle.

19. The method of claim 14 wherein the voltage of the carrier signal decreases to zero voltage half way through the switching cycle.

* * * * *